United States Patent
Hobby

(10) Patent No.: US 6,762,394 B2
(45) Date of Patent: Jul. 13, 2004

(54) HEATED STEERING WHEEL

(75) Inventor: Raymond Thomas Hobby, West Midlands (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 193 days.

(21) Appl. No.: 09/908,055

(22) Filed: Jul. 18, 2001

(65) Prior Publication Data

US 2002/0008097 A1 Jan. 24, 2002

(30) Foreign Application Priority Data

Jul. 22, 2000 (GB) ................................. 0017930
Oct. 13, 2000 (GB) ................................. 0025074

(51) Int. Cl.[7] ................................................ H05B 3/00
(52) U.S. Cl. ..................... 219/204; 219/202; 219/206; 219/209; 219/528; 219/529; 219/549
(58) Field of Search ................................. 219/202–204, 219/206–209, 212, 528–529, 543–545, 549, 519, 476

(56) References Cited

U.S. PATENT DOCUMENTS

| | | |
|---|---|---|
| 2,662,961 A | 12/1953 | Sargent |
| 4,535,221 A | 8/1985 | Holsworth ............... 219/204 |
| 4,547,655 A | 10/1985 | Kurata et al. ............ 219/204 |
| 4,549,069 A | 10/1985 | Oge ......................... 219/204 |
| 4,631,976 A | 12/1986 | Noda et al. ................ 74/552 |
| 4,640,340 A | 2/1987 | Noda et al. ................ 165/41 |
| 5,072,093 A | 12/1991 | Scheuerer ................ 219/204 |
| 5,294,775 A | 3/1994 | Carrier ..................... 219/204 |
| 5,605,643 A | 2/1997 | Reece ....................... 219/204 |
| 5,847,360 A | 12/1998 | Lorenzen et al. ........ 219/204 |
| 5,850,741 A | 12/1998 | Feher ........................ 62/3.61 |
| 6,007,420 A | 12/1999 | Harm et al. ............. 454/140 |
| 6,093,908 A | 7/2000 | Haag ........................ 219/204 |
| 6,172,342 B1 | 1/2001 | Khafagy et al. ......... 219/497 |
| 6,268,588 B1 | 7/2001 | Hazebrouck et al. ... 219/204 |
| 6,282,982 B1 * | 9/2001 | Testa ......................... 74/558 |
| 6,326,593 B1 | 12/2001 | Bonn et al. .............. 219/204 |
| 6,441,344 B1 * | 8/2002 | Bonn et al. .............. 219/204 |

FOREIGN PATENT DOCUMENTS

| | | |
|---|---|---|
| DE | 19910132 | 3/2000 |
| EP | 0989045 | 7/1999 |
| WO | 9939963 | 8/1999 |
| WO | 9939964 | 8/1999 |

* cited by examiner

Primary Examiner—Shawntina Fuqua
(74) Attorney, Agent, or Firm—Lonnie Drayer; Jarett Rieger

(57) ABSTRACT

The invention relates to a heated steering wheel having a steering wheel rim with a heating device arranged on the steering wheel rim. A shell has two or more shell parts that each extend at least part of the way around the periphery of the steering wheel rim in radial cross-section. The shell parts are joined together by an adhesive intentionally applied only to mutually contacting surfaces of said shell parts. The invention also relates to a method of manufacturing a heated steering wheel.

16 Claims, 6 Drawing Sheets

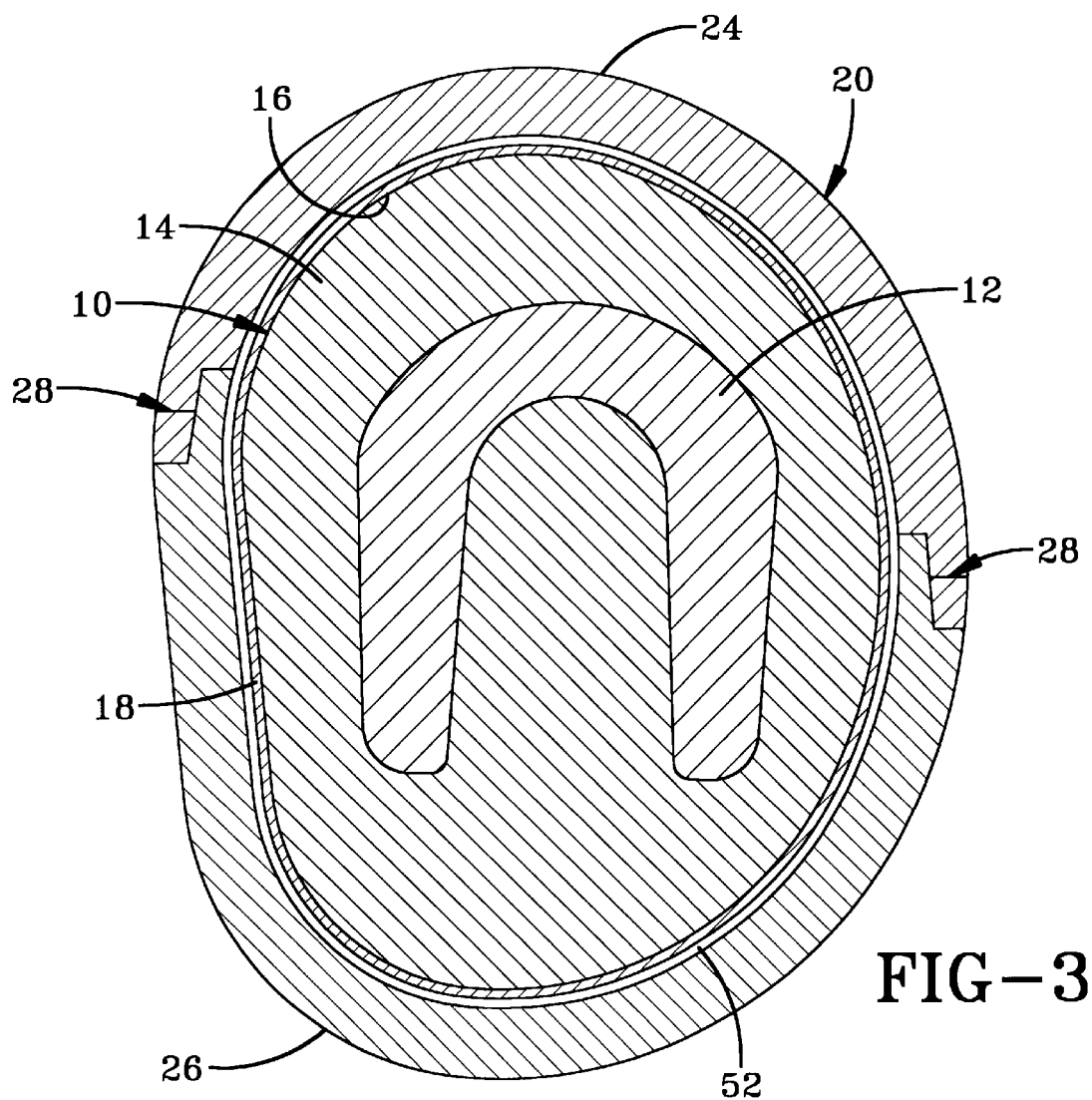
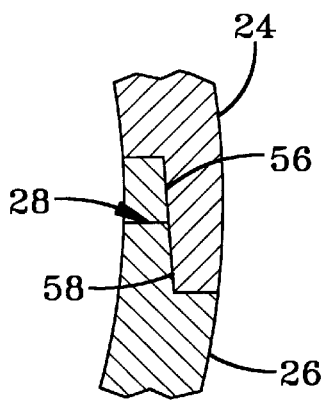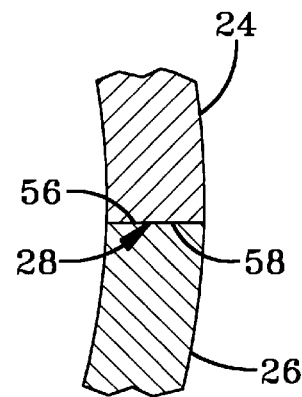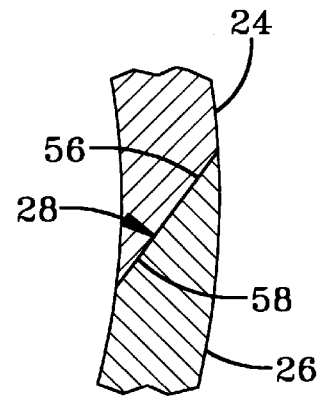
FIG-3
FIG-4   FIG-5   FIG-6

HEATED STEERING WHEEL

FIELD OF THE INVENTION

The present invention relates to a heated steering wheel and a method of manufacturing the same.

BACKGROUND OF THE INVENTION

In steering a motor vehicle in cold conditions, say, near to or below 0° C., a driver with his hands on a cold surface of a steering wheel may experience some discomfort. The use of a heating device to heat an outer surface of the steering wheel rim is a known way of overcoming the above concern, the heating device being arranged between the steering wheel rim and a covering such as leather wrapped around the steering wheel rim.

In some motor vehicles a decorative section of a laminated wood is mounted onto the steering wheel rim. For such a wooden laminate covered steering wheel rim, a known method of mounting the laminated sections onto the steering wheel rim is to apply glue to the inner surfaces of the sections which are 3 mm–4 mm thick and attached them to the steering wheel rim. The problems associated with heating these sections using a heating device below the surface of the laminated section are the very poor thermal conductivity of the wood laminate and its tendency to crack when heated due to the differences in expansion of the various wood sections. In addition, the sections of the wood laminate can be forced apart by expansion of the adhesive.

There is provided in accordance with the present invention a heated steering wheel comprising a steering wheel rim, heating device arranged on the steering wheel rim and a shell comprising two or more shell parts, each shell part extending at least part of the way around the periphery of rim in radial cross-section, wherein the shell parts are joined together by an adhesive applied only to mutually contacting surfaces of the shell parts. The adhesive is not intentionally applied between the heating device and the two or more shell parts and hence the problem of cracking of the shell outlined above is substantially obviated.

There is further provided in accordance with the present invention a method of manufacturing a heated steering wheel. The method comprising the steps of providing a steering wheel rim, arranging heating device on the rim, providing a shell having two or more shell parts, arranging each shell part on the periphery of the rim and attaching the two or more shell parts together, edge to edge by applying adhesive only between said edges.

BRIEF DESCRIPTION OF THE DRAWINGS

FIG. 3 is a radial cross-section of the steering wheel shown in FIG. 1 taken along line 3—3.

FIG. 4 is an enlarged, fragmentary cross-section of the joint between two shell parts of a wooden shell of the steering wheel shown in FIGS. 1 and 3.

FIG. 5 is an enlarged, fragmentary cross-section of the joint between two shell parts of a wooden shell of the steering wheel wherein the joint has an alternative structure.

FIG. 6 is an enlarged, fragmentary cross-section of the joint between two shell parts of a wooden shell of the steering wheel wherein the joint has another alternative structure.

DETAILED DESCRIPTION OF THE INVENTION

Figure 7:
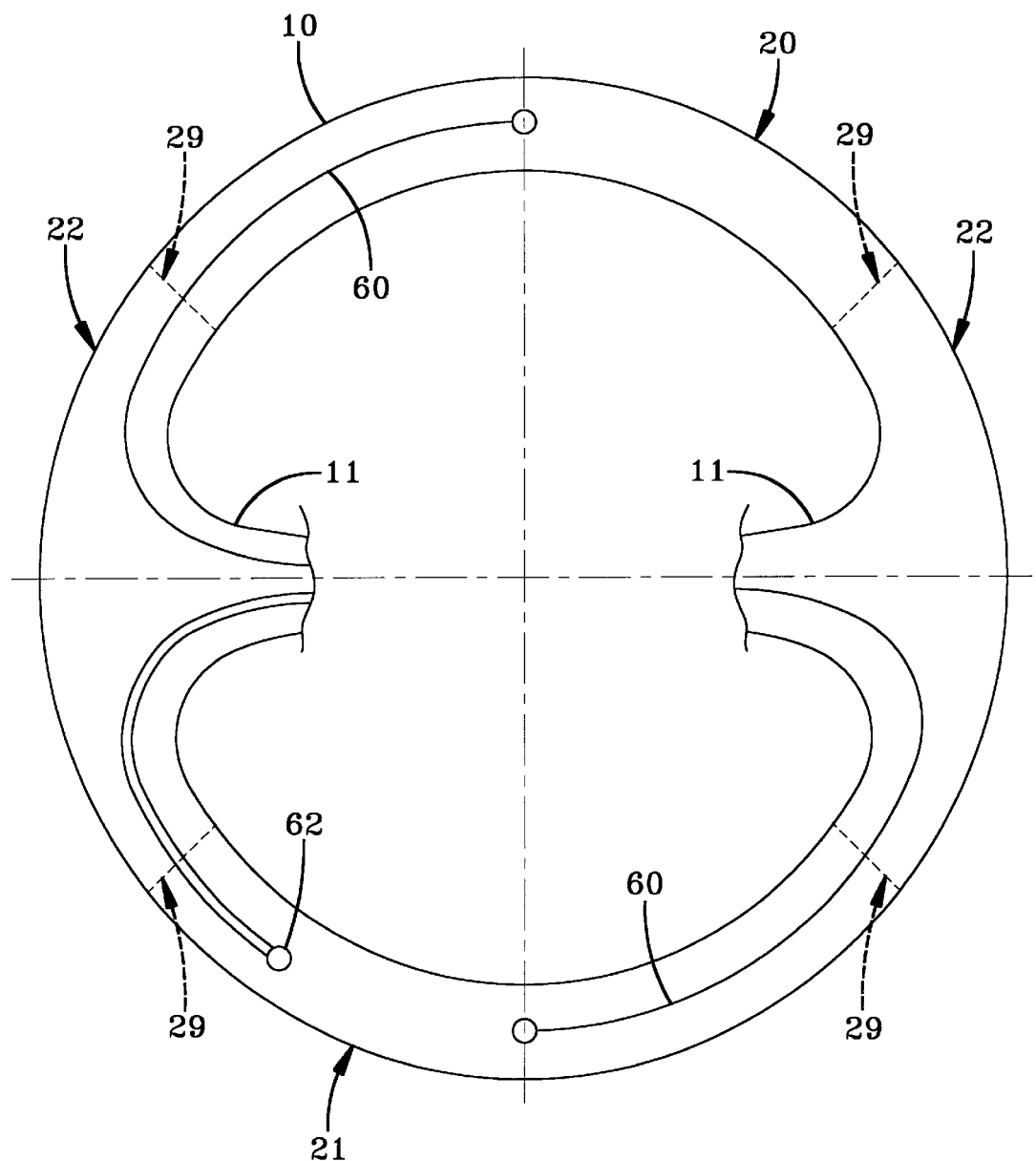
FIG. 7 is a fragmentary plan view of a steering wheel according to the present invention.

FIG. 7 shows a heated steering wheel according to the present invention that comprises a steering wheel rim 10, a hub (not shown) and spokes 11 which join the steering wheel rim 10 to the hub.

Figure 1:
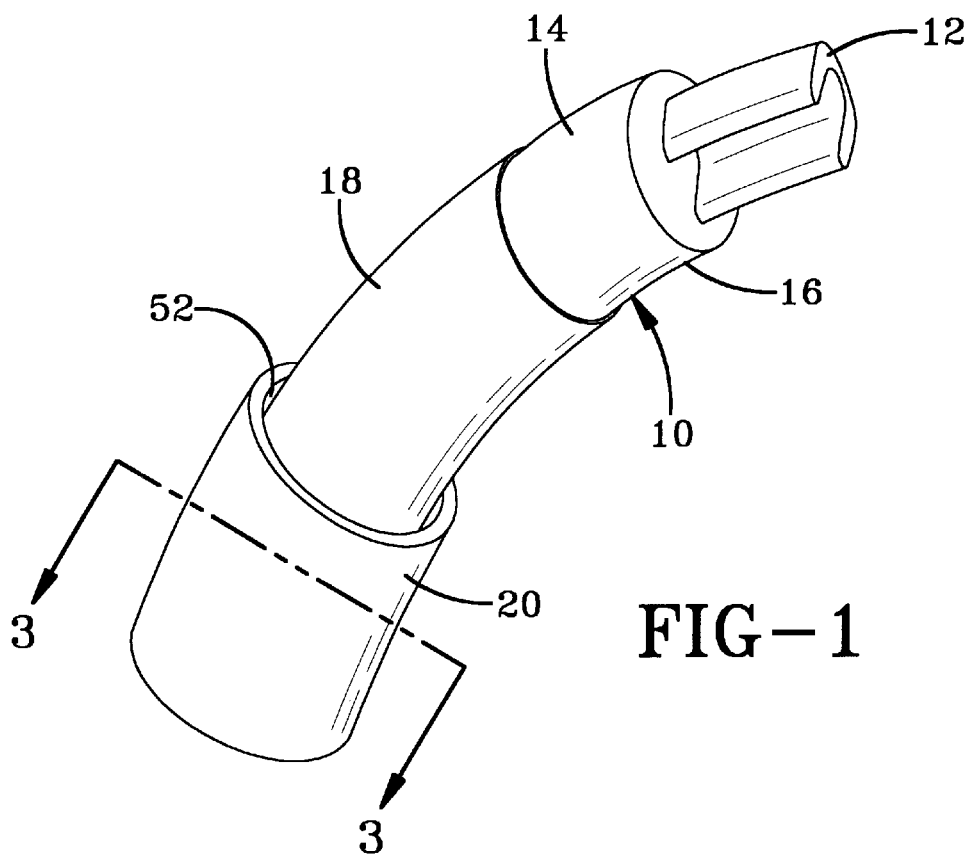
FIG. 1 is a fragmentary perspective view, partially broken away, of a steering wheel according to the present invention.
Figure 2:
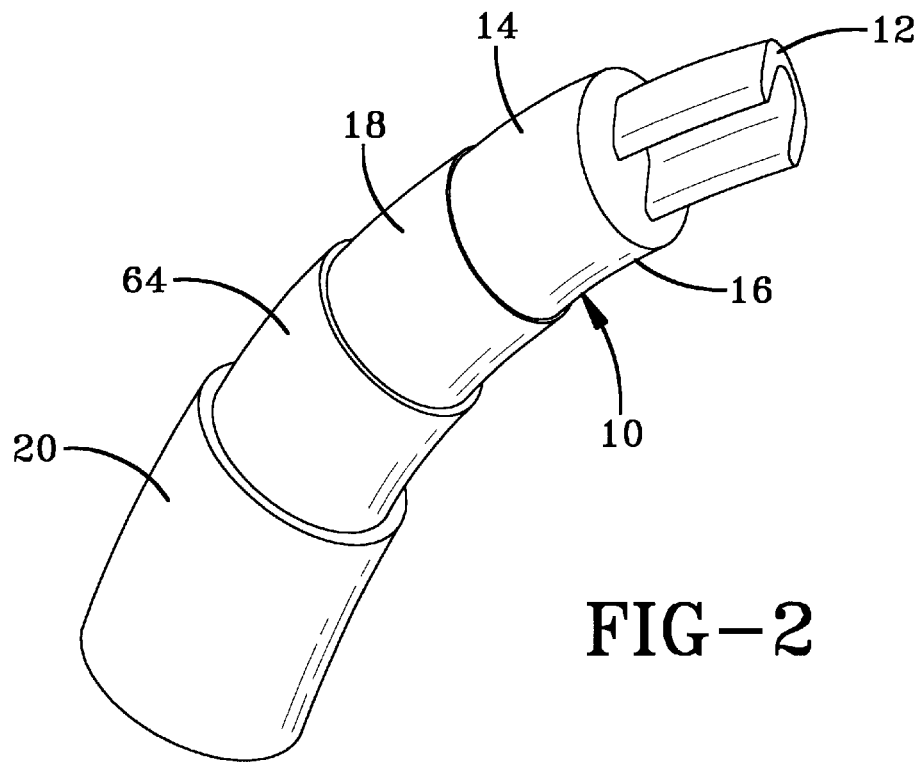
FIG. 2 is a fragmentary perspective view, partially broken away, of another steering wheel according to the present invention.

Referring to FIGS. 1 to 3, the steering wheel rim 10 has a core member 12 that has a U-shaped cross-section. It is understood however that the core member 12 may have any cross-sectional shape that is in accordance with good engineering practice. The core member 12 is surrounded by a covering material 14. The covering material 14 is formed around the core member 12 so as to provide the steering wheel rim 10 with a substantially circular peripheral surface. The term substantially circular should be taken to encompass, for example, an oval cross-section and/or including one or more straight sections, impressions and/or protrusions on the outer surface 16 of the covering material 14.

The outer surface 16 of the covering material 14 has a heating device 18 fixed thereon. The heating device 18 is preferably fixed to the outer surface 16 of the covering material 14 using an adhesive. Preferably, no adhesive is applied intentionally between the heating device 18 and the shell 20. That is to say, an effort is made to prevent unintentionally locating adhesive between the heating device 18 and the shell 20.

A wooden shell 20 is arranged around the outer surface 16 of the covering material 14 and the heating device 18. As can be seen in FIG. 7, the shell 20 extends circumferentially around only part of the steering wheel rim 10. Further, a second wooden shell 21 and leather wrap 22 are provided so as to extend circumferentially around the whole steering wheel rim 10. The wooden shells 20, 21 comprise natural wood or synthetic wood or composite wood laminates while the leather wrap 22 comprise leather or leather-like materials. By use of the word "shell" the applicant encompasses the term "covering" and the like. The first wooden shell 20 and the leather wraps 22 are arranged on the heating device 18 and outer surface 16 of the steering wheel rim 10. The wooden shells 20, 21 extend around the steering wheel rim 10 between the spokes 11. The leather wrap 22, extends around the steering wheel rim 10 adjacent the spokes 11 and along part of the spokes.

As best shown in FIG. 3, each wooden shell 20, 21 comprises a first shell part 24 and a second shell part 26. At least one of the two or more shell parts comprises natural wood or synthetic wood or a combination thereof or a laminated veneer. Preferably, all of the shell parts comprise a composite of glass fiber reinforced adhesive and wooden veneers. Most preferably the composite is thermoformed. Preferably, each of the shell parts extends part of the way around the periphery of a radial cross-section of the steering wheel rim 10 so as to, in combination, extend completely around said periphery and encase the heating device.

Preferably, the first and second shell parts 24, 26 comprise a composite sheet of layers of glass fiber reinforced with adhesive together with wood veneers. The composite is then thermoformed to form a dense shell part that is able to conduct heat efficiently from an inner surface of the shell part to an outer surface 16 of the shell part. The forming of these shell parts is preferably such that the inner surfaces thereof correspond substantially to the outer surface 16 of the covering material 14. That is to say, in the shell parts of preferred embodiments of the invention, the inner surfaces of the shell parts substantially matches the contour of the covering material 14 and the heating device 18. Each of the shell parts has an inner surface proximal the heating device 18 and an outer surface remote from the heating device 18.

As shown in FIG. 3, the shell parts 24, 26, when arranged together to form a shell 20, extend fully around the periphery of the steering wheel rim 10 in radial cross-section. It is preferable for good heat transfer that the shell, that is to say each shell part, is less than 3 mm thick, and, most preferably, 1.2 mm to 1.4 mm thick.

The two shell parts 24, 26, are joined together along mutually contacting circumferential edges at a joint regions 28. The shell parts have complimentary surfaces in the form of edges and ends. Mating shell parts are joined together by an adhesive applied only between mutually adjacent edges and ends thereof.

In FIG. 4 a joint region 28 is defined by a first joint surface 56 on one shell part 24, having a ledge and a second joint surface 58 on another shell part 26 having a corresponding ledge. The two joint surfaces 56, 58 mate so that the inside/outside ends and edges of the wooden shells 20, 21 are substantially flush with one another. It will be appreciated that the ledges of the two joint surfaces 56, 58 tend to increase the length of the joint region 28, thereby increasing the strength of the joint.

In FIG. 5 the joint surfaces 56, 58 are in the form of shell ends that extend radially. Such a joint is simple to manufacture.

In FIG. 6 one joint surface 56 is a shell end inclined inwardly and the other joint surface 58 is a shell end inclined outwardly correspondingly. Such a joint is stronger than the radical joint but still relatively simple to manufacture.

Figure 9:
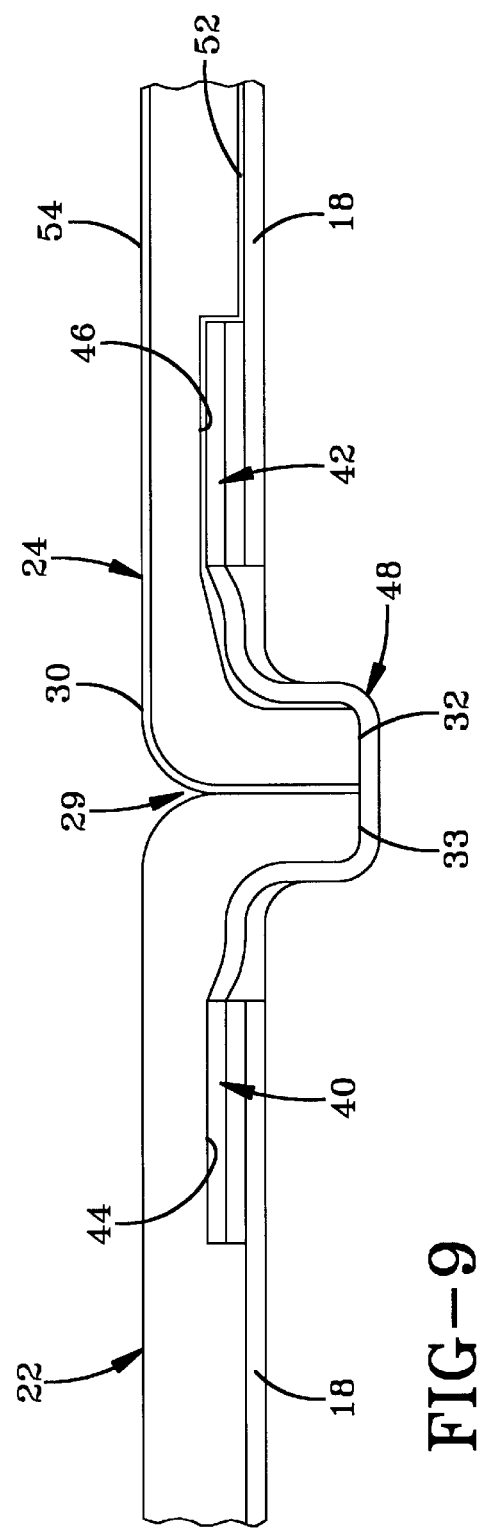
FIG. 9 is a fragmentary circumferentially extending cross-section of a steering wheel showing details of the structure of the heating device of another embodiment of the invention.

Referring to FIG. 9, the respective adjacent ends 30 of the wooden shells 20, 21 and leather wraps 22 meet at an interface 29 intended to protect the ends from wear and tear. At an end 30 of each wooden shell 20, 21 there is provided a transverse, preferably radial, arm 32. At an end of each leather wrap 22 there is provided a transverse arm 33. The two arms 32, 33 come together at an interface 29.

When manufacturing a steering wheel that has both a wood shell 20, 21 and a leather wrap 22 covering the steering wheel rim 10, it is preferable to form a annular recess 34 in the steering wheel rim 10 to accommodate an end of the wood shell and an end of the leather wrap. Such accommodation of the ends of the wood shell and leather wrap protects the ends from exposure to prevent wear and tear. The recess dictates that there must be a break in the heating device. However, the heating device 18 should communicate with one another to allow heat transfer therebetween so that they do not have to be individually connected to heating circuitry to allow heating. To address that problem, as shown in FIG. 9, preferably the heated steering wheel rim 10 assembly has a second heating device 18 arranged on the steering wheel rim 10. The second heating device 18 is spaced circumferentially apart from a first heating device 18 with a second shell positioned over a second heating device.

Preferably, the heated steering wheel has a second heating device 18 arranged on the steering wheel rim 10. The second heating device 18 is spaced apart from the first heating device 18 along a longitudinal axis of the steering wheel rim 10. The heated steering wheel rim 10 further comprising a second shell positioned over the second heating device 18 and the steering wheel rim 10 having a annular recess 34 between the first heating device 18 the second heating device 18 which receives an end of the first shell and an end of the second shell. The annular recess 34 and the shells are sized to accommodate a current conductor, shown as 50 in FIG. 10 and FIG. 11, in the annular recess 34 to conduct electrical current from the heating device 18 to the second heating device.

Figure 8:
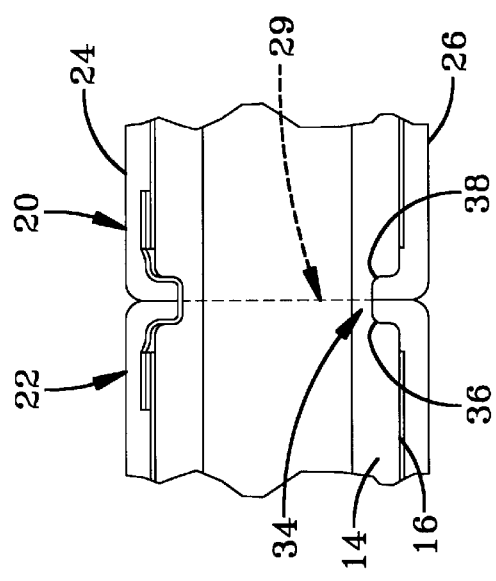
FIG. 8 is a fragmentary circumferentially extending cross-section of a steering wheel showing details of the structure of one embodiment of the invention.

As shown in FIGS. 8 and 9, an annular recess 34 is formed in the outer surface 16 of the covering material 14 on the steering wheel rim 10. The annular recess 34 has rounded sides 36, 38. Preferably, one or both ends of the current conductor are connected to a bus bar on the respective heating device. First and second bus bars 40, 42 are provided. A first bus bar 40 is positioned on a first heating device 18 part adjacent the interface 29 and a second bus bar 42 is positioned on a second heating device 18 part also adjacent the interface 29. The bus bars 40, 42 are substantially flat.

Preferably, the step of arranging the shell parts 24, 26 on the steering wheel rim 10 includes separating the adhesive from the heating device 18. It is important that the means for separating the adhesive that joins together the shell parts from the heating device does not excessively affect heat transfer from the heating device 18 to the shell 20. The means for separating the adhesive that joins together the shell parts from the heating device allows expansion of the steering wheel rim 10 and the shell without the shell cracking. Furthermore, the means for separating the adhesive that joins together the shell parts from the heating device stops adhesive from unintentionally flowing onto the heating device. In one preferred embodiment of the invention a means for separating the adhesive that joins together the shell parts from the heating device is an air gap indicated by 52 in FIG. 1 and FIG. 3, most preferably a gap of 0.5 mm to 0.75 mm. In another embodiment of the invention, the means for separating the adhesive that joins together the shell parts from the heating device is a layer of a material indicated by 64 in FIG. 2, most preferably a layer of a material such as a low-density polyether or similar foam. As shown in FIG. 9, a first recess 44 is provided in each leather wrap 22 to stop a bulge forming when the leather wrap is applied over the respective sections of the heating device 18. A second recess 46 is provided in the mating wooden shell part 24. The second recess 46 allows for continuation of an air gap 52 between the shell and the heating device 18 as a means for separating the adhesive that joins together the shell parts from the heating device.

Figure 10:
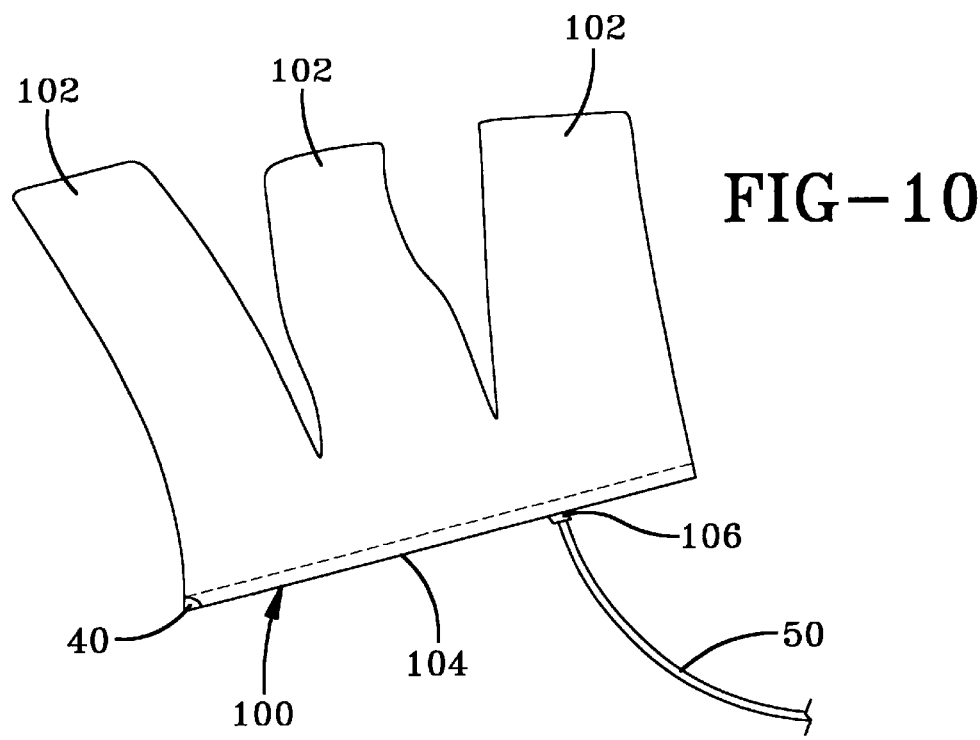
FIG. 10 is a perspective view of a heating device that can be used in the present invention.
Figure 11:
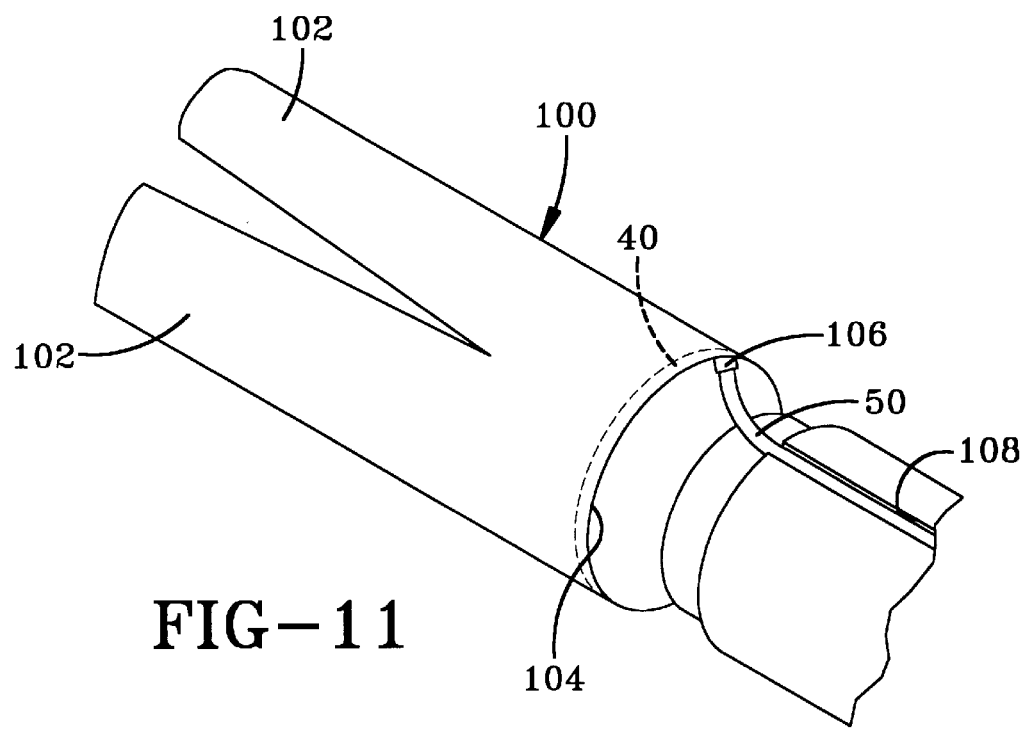
FIG. 11 is a perspective view of the heating device of FIG. 10 formed that can be used in the present invention.

A electrical conductor 48 such as a cable 50 shown in FIGS. 10 and 11, is provided to join adjacent ends 30 of the two heating device. More specifically, the cable 50 is attached at each of its ends to the respective bus bars 40, 42. The cable 50 sits snugly in the annular recess 34.

An air gap 52 is maintained between the heating device 18 and the wooden shell 20, 21. Each of the heating device 18 are joined by wiring 60 to a wiring system (not shown) in the hub (not shown) via a spoke 11.

A temperature sensor is located below each of the wooden shells 20, 21. It will be appreciated that the location of the connection between the wiring system and the heating device 18 and the temperature sensor underneath the wooden shells 20, 21 prevents the driver from feeling those components under the surface of the wheel.

The present invention provides a heated steering wheel in which the area of contact between an adhesive and a decorative shell is minimized to limit the chance of cracking of said shell. FIG. 2 shows an alternative embodiment of the invention wherein a layer 64 of low density polyether or foam or the like takes the place of the air gap 52 of FIG. 1 for the same purpose of providing a thermally complaint structure. The air gap 52, or the layer 64, is preferably thin, most preferably in the order of 0.5 mm to 0.75 mm in thickness. Such dimensions are sufficient to allow expansion of the steering wheel and the shells without cracking.

In another embodiment of the invention (not shown), the four heating device 18 are slightly lengthened allowing longitudinal overlap to occur between adjacent heating device 18 at interfaces shown in FIG. 7 as 29. Adjacent ends 30 of two heating device 18 are connected in substantially the above manner with the bus bars 40, 42, as shown in FIG. 9, which joins adjacent ends 30 of two heating device 18. The ends of two heating devices 18 are then pinched. The pinched part that comprises the contact regions between each heating device 18 and the bus bars 40, 42 is arranged substantially flatly underneath the heating device 18. The cold areas at the junction of the bus bars 40, 42 and the heating device 18 are under one or both of the heating device 18. Therefore, any cold spots are covered by the heating device 18 from a driver's point of view. It will be appreciated that a substantially constant temperature-heating device 18 is offered to the driver by the above arrangement. Furthermore, an annular recess 34 is provided to house the pinched part so that it is accommodated without causing raised parts on the outer surface of the steering wheel rim 10.

Referring to FIG. 10, the heating device comprises a woven piece of known fabric 100 including conductive fiber or a conductive coating that heats up on application of electric current. The fabric 100 is cut in a particular manner to form elongated fingers 102. The fingers 102 are connected at an end 104 of the fabric 100. A first bus bar 40 is provided along the end 104 of the fabric. The cable 50 is conductively connected to the first bus bar 40 via a connection 106.

On assembly, as shown in FIG. 11, each of the elongated fingers 102 is individually arranged on the surface of the steering wheel rim with the longitudinal axis of the fingers 102 generally parallel to the circumferential axis of the steering wheel rim.

The bus bars 40, 42, which cooperate with the cable 50 to transfer power from the wooden shell parts to the leather wrap are stuck on the foam with non-conductive glue (not shown). The bus bars 40, 42 are conductively attached to opposing bus bars of the circumferentially adjacent heating device 18 with conductive glue. The junction of the two bus bars 40, 42 is then covered by insulating tape.

A protective layer of glue is applied all over the heating device 18 as soon as the fingers 102 are applied to the steering wheel rim to protect the heating device 18 form salt and sweat corrosion. The cables 50 are positioned under the shell parts 20, 21, in thermal expansion grooves 108. Under the leather, the electrical wires 116, 118 are glued into 1.8 mm grooves 108. These grooves can have a "pear" cross-section with the narrow end outermost. The cables can be resiliently introduced into the grooves 108 through the supply to the respective strip.

Figure 12:
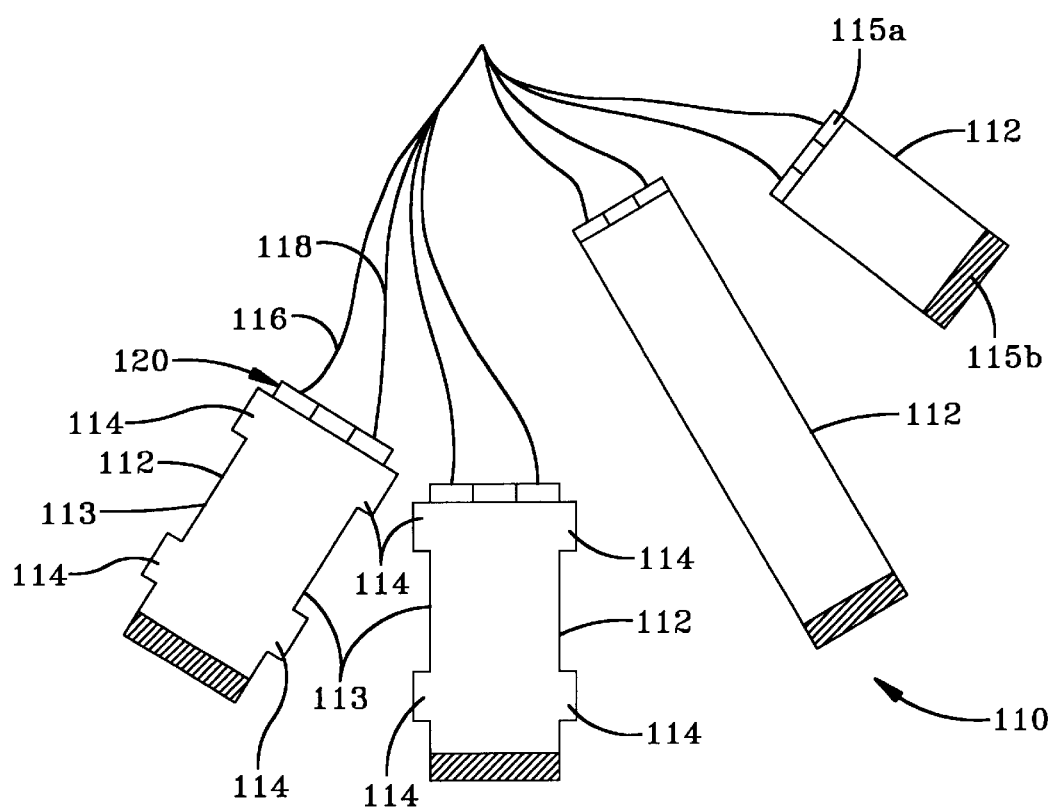
FIG. 12 is a pictorial representation of the heating device and associated wiring that may be used in a half wood embodiment of a steering wheel of the present invention.

In another embodiment of the invention, shown in FIG. 12, yet another type of heating element 110 is envisaged. The heating element 110 comprises a plurality of separate patches or strips 112 or the like, with four strips shown in this example. The strips 112 are made of a material known as Carbotex®. This material has advantageous thermal properties. In particular, the electrical resistance of Carbotex® is relatively stable across a range of temperatures and the tolerance is plus/minus 10% with respect to the nominal value of a design circuit, that characteristic making a more efficient thermal control. Of course, it is understood that the heating element 110 may be made of any suitable material, and that Carbotex® is merely an example of such a material.

The strips 112 are elongate, most conveniently of approximately rectangular shape. It can be seen form FIG. 12 that a strip 112 can be provided with one or more (here four) tabs 114. The tabs 114 extend, two from each long side 113 of the strip 112, one from a point towards one end of the long side 113 and one from a point towards the other end of the long side 113. The tabs 114 are designed to be located in the areas under the intersection between the steering wheel rim 10 and a spoke 11.

The strips 112 have self-adhesive surfaces 115a, 115b. Further self-adhesive surfaces (not shown) are provided on the reverse of the strips 112. Conveniently, the further self-adhesive surfaces are approximately the same size and shape as surfaces 115a, 115b. In that way, the inside (i.e., the side shown) and the outside (i.e., the side not shown) of the strip 112 can stick onto, respectively the wheel and other strips. The surfaces 115a, 115b may or may not have a non-stick protective film applied thereto, which is removable from surfaces of the strips 112 prior to placement of the strips on the steering wheel rim 10.

Two wires 116, 118 for conducting electricity are connected at one end 120 (in the embodiment shown the short end) of the elongate strip 112 to allow electricity to the respective strip. Once the strips 112 are electrically connected, they are ready to be fitted on the foam layer 64. No electrical connections are required during the gluing of the strips 112 to the foam layer 64. The only electrical connections that are necessary are the plug-in of the electrical connections into a respective housing defined by the foam layer 64.

In the half wood version of the steering wheel rim 10, the electrical circuit is divided into two independent sections, namely, the first section of wooden shells 20, 21 and the second section of leather wraps 22. The heating elements under the wooden shells 20,21 are connected in parallel and the heating device 18 under the leather wraps 22 is connected in parallel. The two parallel circuits are then connected in series. This arrangement gives a better heating control of the system overall.

In the half wood version, due to the necessity for four heating device 18 patches 112, there are eight exciting wires from the steering wheel rim 10, for each of the four patches, plus two wires for the thermal couple; a total of ten wires. A new connection is provided to connect all the ten wires to a controller that has a three-way connector. Both the wires and the heating device 18 strips 112 can be hidden in the leather wrap and/or wood shell by co-molding of the polyurethane foam layer 64 and the heating device 18 strip 112 and the wires 116, 118. Typical materials that can be used in the co-molding are expanded polypropylene or expanded polyethylene. The foam layer 64 is dimensioned accordingly to the thickness of the strip 112 and diameter of the electrical wires 116, 118.

Where the steering wheel rim 10 is designed to be covered only by wood or only by leather, the heating device 18 comprises a single strip, not shown, of the Carbotex® material, in which the electrical circuit is split into two parallel circuits. There are two wires for the heating device 18 and two wires for the thermocouple. The thermal control for this embodiment is intended to be the same or similar to the fabric 100 of the previous embodiment.

According to yet another aspect of the invention, there is provided a heated steering wheel comprising a steering wheel rim 10, a heating device 18 applied about the circumference of the steering wheel rim 10, wherein the heating device 18 is divided into a plurality of completely independent strips, each of the strips being independently electrically connected for connection to a power source. Each of the strips is preferably elongate so that it can be applied along the steering wheel rim 10 substantially parallel to the longitudinal axis of the steering wheel rim 10. The strips are preferably self-adhesive and may be with or without a film to protect the adhesive surface prior to placement on the steering wheel rim 10.

A heated steering wheel according to the present invention may have an electrical conductor which runs through a spoke to connect the heating device to a wiring system, wherein the location at which the electrical conductor is connected to the heating device is arranged to be towards the top or bottom of the steering wheel when the wheel is in a neutral orientation.

While in the embodiments hereinbefore described real wood is referred to, the term "wooden shell" encompasses mock wooden shells and the like also. Those skilled in the art will recognize further enhancements that may be made to the embodiments described herein without departing from the scope of the present invention which is limited only by the appended claims.

I claim:

1. Heated steering wheel comprising a steering wheel rim, a heating device arranged on the steering wheel rim and a shell comprising two or more shell parts, each shell part extending at least part of the way around the periphery of the steering wheel rim in radial cross-section, wherein the shell parts are joined together by an adhesive intentionally applied only to mutually contacting surfaces of said shell parts.

2. The heated steering wheel of claim 1 wherein the shell parts having complimentary edges and ends, mating shell parts being joined together by adhesive applied only between mutually adjacent edges and ends thereof.

3. The heated steering wheel of claim 1 wherein the shell is less than 3 mm thick.

4. The heated steering wheel of claim 1 wherein the shell is 1.2 mm to 1.4 mm thick.

5. The heated steering wheel of claim 1 wherein at least one of the shell parts comprises natural wood or synthetic wood or a combination thereof.

6. The heated steering wheel of claim 5 wherein all of the shell parts comprise a composite of glass fiber reinforced adhesive and wooden veneers.

7. The heated steering wheel of claim 6 wherein the composite is thermoformed.

8. The heated steering wheel of claim 1 wherein each of the shell parts extends part of the way around the periphery of the cross-section of the steering wheel rim so as to, in combination, extend completely around said periphery and encase the heating device.

9. The heated steering wheel of claim 1 wherein the adhesive that joins together the shell parts is separated from the heating device.

10. The heated steering wheel of claim 9 wherein the adhesive that joins together the shell parts is separated from the heating device by an air gap.

11. The heated steering wheel of claim 9 wherein the adhesive that joins together the shell parts is separated from the heating device by a layer of material.

12. The heated steering wheel of claim 11 wherein the layer of material comprises a foam or low density polyether.

13. The heated steering wheel of claims 9 wherein the means for separating the adhesive that joins together the shell parts from the heating device has a thickness of 0.5 mm to 0.75 mm.

14. The heated steering wheel of claim 1 wherein each of the shell parts has an inner surface proximal the heating device and an outer surface remote from the heating device, and adhesive is between said inner and said outer surfaces of at least two of the shell parts.

15. The heated steering wheel of claim 14 wherein the inner surfaces of the shell parts substantially matches the contour of the outer surface of the steering wheel rim and the heating device.

16. The heated steering wheel of claim 1 further comprising a second heating device arranged on the steering wheel rim, the second heating device being circumferentially spaced apart from the first heating device, a second shell positioned over the second heating device, the steering wheel rim having a recess located between the first heating device and the second heating device which receives an end of first shell and an end of second shell, and the recess and the shells are sized to receive a current conductor in the recess to conduct electrical current from the heating device to the second heating device.

* * * * *